July 29, 1941.   W. S. THOMPSON ET AL   2,250,734
DIRIGIBLE HEADLIGHT
Filed Sept. 26, 1939   3 Sheets-Sheet 1
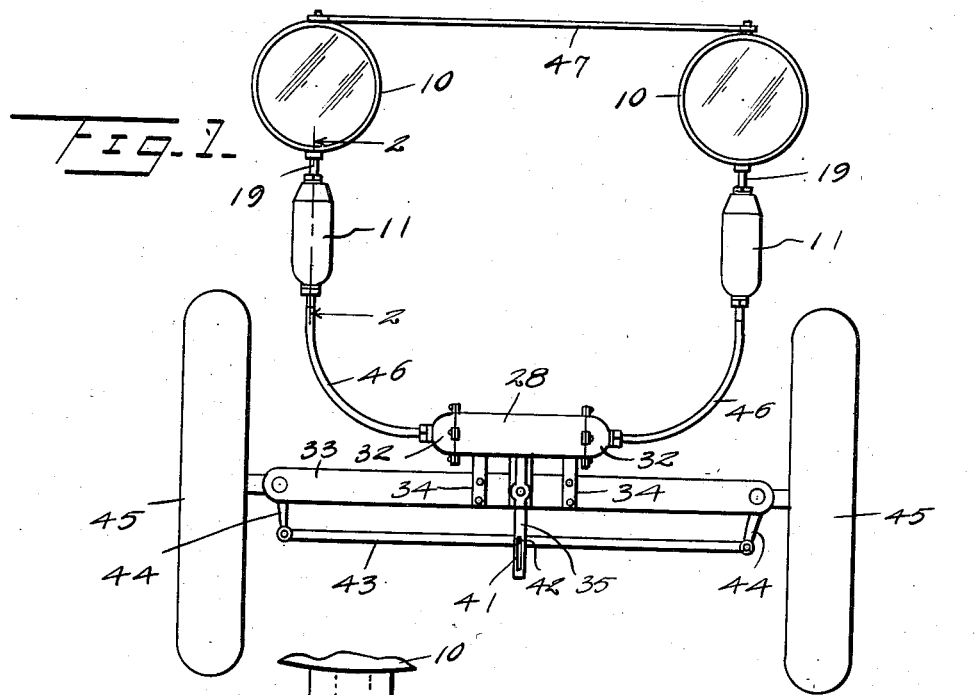
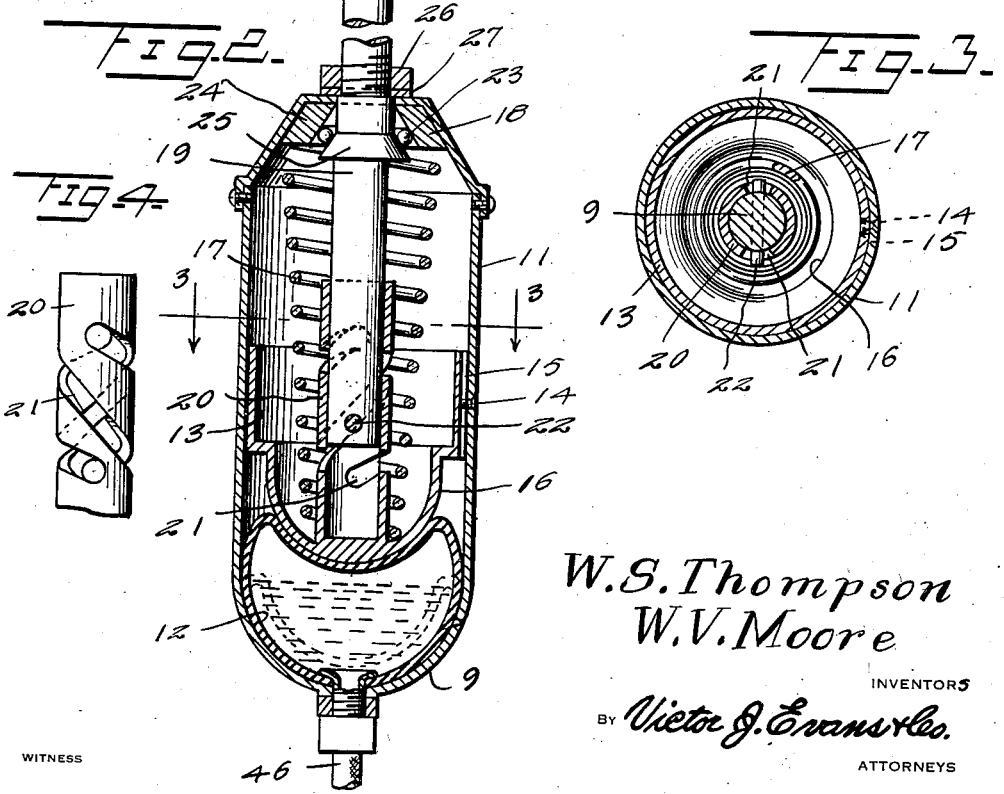
W. S. Thompson
W. V. Moore
INVENTORS
BY Victor J. Evans & Co.
ATTORNEYS
WITNESS

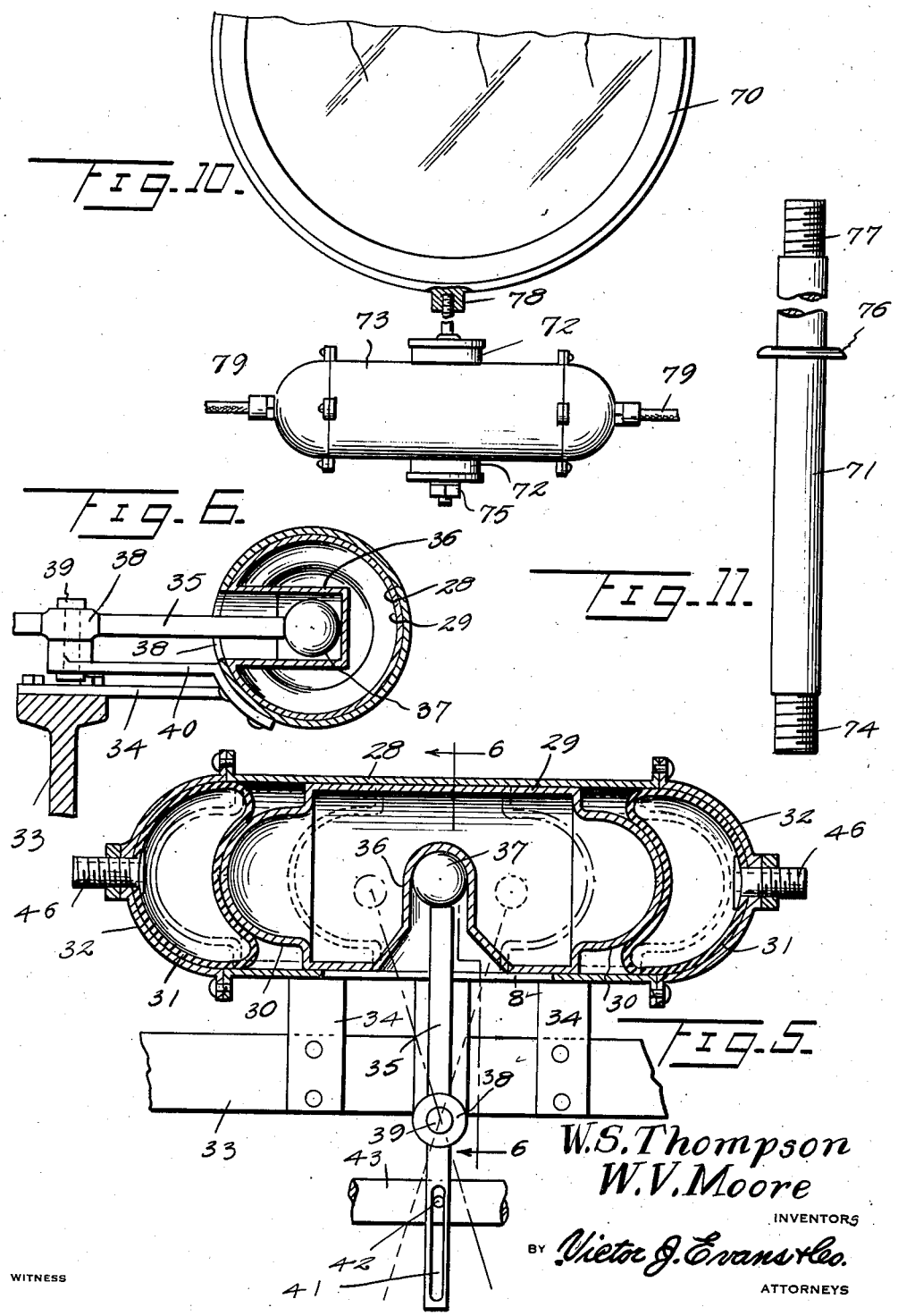

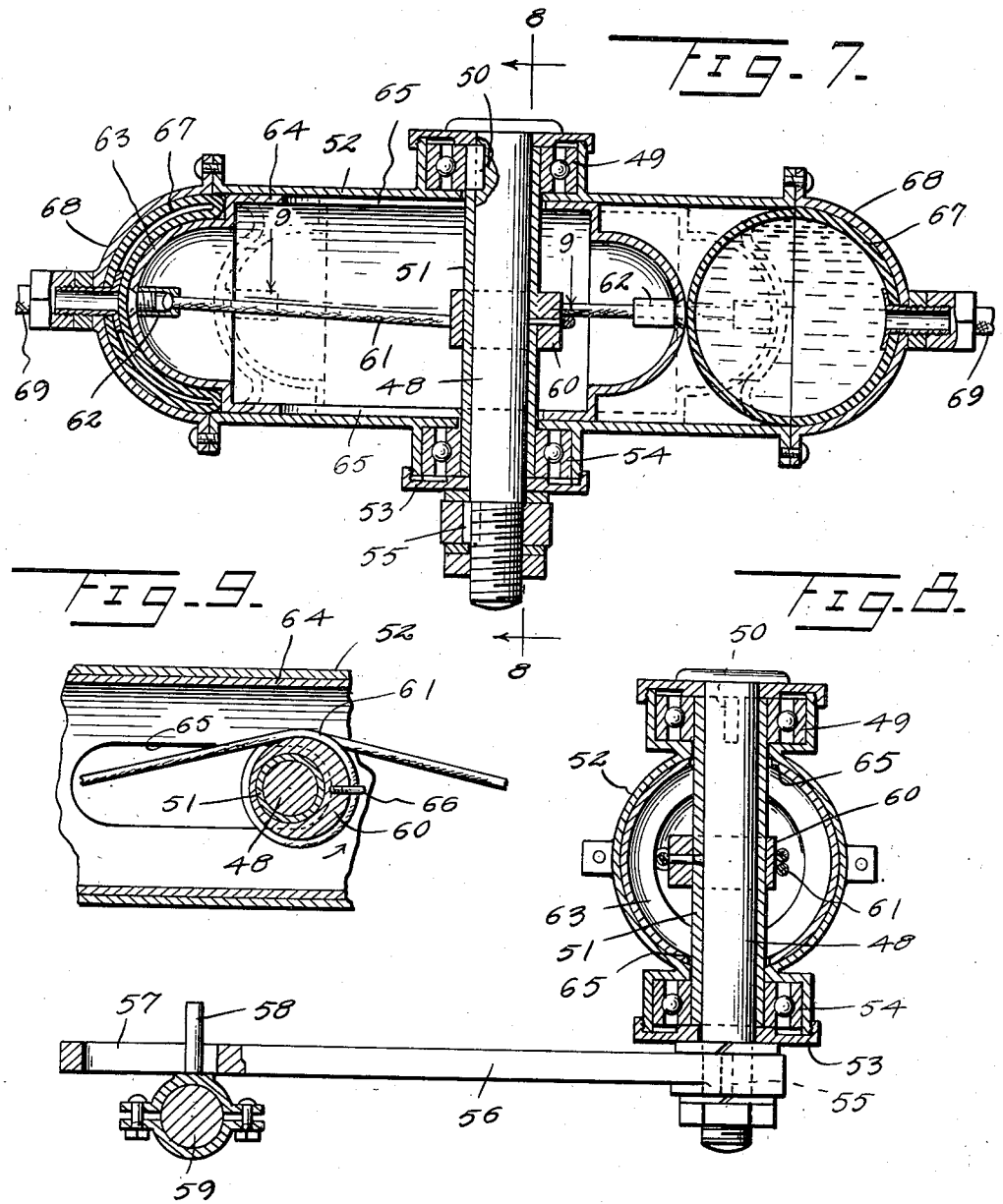

Patented July 29, 1941

2,250,734

UNITED STATES PATENT OFFICE 2,250,734

DIRIGIBLE HEADLIGHT

Wallace S. Thompson and Walter V. Moore, Elk Park, N. C.

Application September 26, 1939, Serial No. 296,648

3 Claims. (Cl. 240—62.3)

This invention relates to dirigible headlights of the type controlled from the steering mechanism to follow automatically the curves of the road.

The disadvantage of conventional structures of this type is that any form of piston, cup leathers, etc., has a motion lag. At best, in master cylinders of hydraulic systems the piston moves an appreciable distance before it begins to operatably act on the fluid, and this results in lag in transferring motion from the steering mechanism to the lights. Again if pressure is held for any considerable time the fluid begins to seep past the piston.

With the above in mind an object of the present invention is to provide flexible containers, such as rubber balls or bags, filled with brake fluid under slight pressure and devoid of air pockets, as a motion transmitting medium. The fluid is incompressible and any movement applied to the ball is immediately transferred to any movable member that is connected with it. As the ball is completely enclosed by the cylinder and piston, danger from rupture due to excessive pressure is exceedingly remote.

A further object is to provide a dirigible headlight of the hydraulic type which is formed of a few strong simple and durable parts, which is inexpensive to manufacture and which will not easily get out of order under severe conditions of service.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a diagrammatic view of dirigible headlight apparatus constructed in accordance with the invention.

Figure 2 is a longitudinal sectional view taken on the line 2—2 of Figure 1, drawn to large scale and showing one of the headlight cylinders.

Figure 3 is a cross sectional view taken on the line 3—3 of Figure 2.

Figure 4 is a fragmentary side elevation of the cam sleeve of the piston of the headlight cylinder.

Figure 5 is a longitudinal sectional view of the master cylinder shown in Figure 1.

Figure 6 is a cross sectional view taken on the line 6—6 of Figure 5.

Figure 7 is a longitudinal sectional view of a modified form of master cylinder.

Figure 8 is a cross sectional view taken on the line 8—8 of Figure 7.

Figure 9 is a detail longitudinal sectional view taken on the line 9—9 of Figure 8.

Figure 10 is a front elevation of a single headlight operated by a lamp cylinder of the type shown in Figure 7.

Figure 11 is a side elevation of the lamp carrying shaft shown in Figure 10.

Referring now to the drawings in which like characters of reference designate similar parts in the various views, where dual headlights 10 are used as shown in Figure 1, each headlight is provided with a respective lamp operating cylinder 11 shown best in Figure 2. The cylinder is provided with a rounded bottom wall 9 to receive a rubber ball 12 which is filled with brake fluid under slight pressure and devoid of entrapped air. A piston 13 is mounted for rectilinear movement in the cylinder through the medium of a guide pin 14 which enters a slot 15 formed in the wall or skirt of the piston. The piston is provided with a rounded head 16 which is yieldably held in position to slightly deform the ball by a helical spring 17 which is confined under compression between the head 16 of a piston and the top wall 18 of the cylinder. While a rounded piston head is shown for deforming the ball and becoming imbedded therein, the piston head need only be of less diameter than the cylinder and the head of the cylinder may even be flat, it only being essential that the ball have rolling and unrolling action on the piston imbedded therein when the piston is moved.

The headlight is mounted upon a headlight carrying shaft 19 which is disposed axially in the cylinder 11 and is rotatably received in a sleeve 20 which is formed integral with the piston 13 and forms a piston rod for the latter. The sleeve is formed with a helical cam groove 21 which is of different pitch at the ends than at the central portion thereof. The groove receives a pin 22 which is disposed transversely of the shaft 19. By virtue of the intermediate fast and terminal slow portions of the pitch of the cam groove the shaft will be accelerated at the intermediate portion of its turning movement in either direction as the piston is moved either by the spring 17 or by pressure exerted by the ball 12.

Ball bearings 23 are disposed between a race 24 in the cylinder top wall 18 and a cone 25 on the shaft to promote free turning movement of the shaft. A nut 26 and washer 27 on the shaft outside the top wall of the cylinder coact with the cone 25 in preventing endwise movement of the shaft.

As best shown in Figures 1 and 5, a master cylinder 28 is provided with a piston 29 having rounded heads 30 at the opposite ends which bear against, and which partly deform, rubber balls 31 filled with brake fluid under slight compression. The balls are confined between the heads of the piston and rounded end walls 32 of the cylinder. The cylinder is secured to the front axle 33 of the vehicle by brackets 34 to extend longitudinally of the axle.

The prime mover of the piston is a lever 35 which enters a pocket 36 formed in the rear side of the piston and which opens through a slot 8 in the rear side of the cylinder as shown in Figure 6. The lever carries a thrust bearing ball 37 which bears against the sides and inner ends of the pocket to transmit motion to the piston. The lever is provided intermediate its ends with a tubular bearing 38 which receives a pivot pin 39 carried by a bracket arm 40 which is secured to the cylinder. The free end of the lever is provided with a longitudinal slot 41 which receives a pin 42 projecting from the tie rod 43 of the steering knuckles 44. When the tie rod is moved endwise during turning movement of the vehicle wheels 45 the lever 35 will be rocked on the pivot pin 39 and move the piston in an opposite direction to the direction of movement of the tie rod to compress one of the rubber balls of brake fluid and permit the other ball of brake fluid to expand as shown by dotted lines in Figure 5.

As best shown in Figure 1 fluid tubes 46 open through the end walls 32 of the master cylinder and communicate with the rubber balls 31 therein. The outer ends of the fluid tubes communicate with the interior of the rubber balls 12 of respective headlight cylinders 11. The headlight cylinders are connected for movement as a unit by a crank iron 47. When one headlight is turned by a movement of the piston in the master cylinder to eject fluid from a respective rubber ball 31 to the respective rubber ball 12 in the headlight cylinder for operating the piston therein, the other headlight will be simultaneously turned in the same direction to effectively illuminate the road in the direction of travel of the vehicle around a curve.

A modified form of master cylinder is shown in Figures 7, 8 and 9. In this form a shaft 48 takes the place of the lever 35, pocket 36 and ball 37 of the form of master cylinder shown in Figures 5 and 6. The shaft 48 is mounted at the upper end in a ball bearing 49 and is keyed at the upper end as shown at 50 to a sleeve 51 which projects below the master cylinder 52 and is provided with a cap 53 which is seated on a ball bearing 54 disposed on the bottom of the master cylinder the shaft projects below the cylinder and is keyed as shown at 55 to one end of a lever 56 which is provided with a slot 57 at the free end to receive a pin 58 carried by the tie rod 59 of the steering knuckles. When the tie rod is moved endwise in either direction the shaft 48 and sleeve 51 will be turned as a unit.

As best shown in Figure 9 a cam disk 60 is secured to the sleeve 51. A member 61 such as a steel tape is coiled upon the disk and secured thereto and the ends of the tape are connected by couplings 62 to respective rounded heads 63 on the ends of the master piston 64 which is provided with slots 65 which receive the sleeve 61 and permit the piston to be moved endwise by winding and unwinding of the tape from the cam sleeve when the sleeve is turned axially. The tape is secured at one point to the cam sleeve by a pin 66. The high side of the cam disk permits movement of the piston to be accelerated at the center of its stroke in the same manner as the change of pitch of the cam groove 21 accelerates the turning movement of the headlight carrying shaft 19 of the headlight cylinder 11.

The heads 63 of the master cylinder confine rubber balls 67, filled with brake fluid under compression, against the rounded end walls 68 of the master cylinder. As previously described one of the balls will be compressed and the other allowed to expand to force the brake fluid through the respective closed circuit fluid pipe 69 to rotate the shaft 19 of a respective headlight, as previously described.

Where a single headlight 70 is substituted for the conventional pair of headlights, and is located at the center of the front of the vehicle, a slightly modified form of the master cylinder just described may be used as the headlight cylinder. As best shown in Figure 10, in lieu of the shaft 48, a shaft 71 is mounted in bearings 72 on the headlight cylinder 73. The lower end of the shaft is threaded as shown at 74 to receive a nut 75 and the upper end of the shaft is equipped with a collar 76 which is supported on the upper bearing 72 and co-acts with the nut in preventing endwise movement of the shaft. The shaft is threaded as shown at 77 above the collar to be threadedly engaged in a socket 78 formed on the headlight 70. The remaining parts associated with the cylinder 73 are duplicates of the parts described in connection with the description of the modified form of master cylinder shown in Figures 7 to 9 inclusive.

The fluid pipes 79 of the single headlight cylinder 73 may be connected to a master cylinder similar to the form shown in Figures 7 to 9, inclusive, or to a master cylinder of the form shown in Figures 5 and 6. The operation of the single headlight cylinder 73 is identical with the operation of the modified form of master cylinder in that rotation of the shaft 71 turns the headlight in a direction corresponding to which one of the fluid filled rubber balls is compressed by the double ended piston.

The scope of the words "rubber ball" or "rubber bag" as used in the specification is extended to include an elongated rubber container, not necessarily spherical, even oval, it being merely necessary to the operation that the piston be imbedded in the container at the extreme forward movement so that in its reverse travel it will displace the same quantity of fluid as would be done by a straight piston.

From the above description it is thought that the construction and operation of the invention will be fully understood without further explanation.

What is claimed is:

1. In dirigible headlight mechanism, motion transmitting means comprising a cylinder having rounded heads at the ends, a piston in the cylinder having rounded heads at the ends, a rotatable shaft mounted transversely of the cylinder, the piston being longitudinally slotted to receive the shaft, means for connecting the shaft to the tie rod of vehicle steering mechanism for turning the shaft axially as the tie rod is moved endwise, a pulley fixed to the shaft within the piston, a cable wound upon the pulley and secured at the ends to respective heads of the piston for moving the piston endwise when the shaft is turned, rubber balls filled with fluid medium and confined between the rounded heads of the cylinder and the rounded heads of the piston, and fluid conducting pipes entering the heads of the cylinder and communicating with the balls for operating hydraulic headlight mechanism when the balls are alternately deformed by movement of the piston.

2. In dirigible headlight mechanism, motion transmitting means comprising a cylinder having rounded heads at the ends, a piston in the cylinder having rounded heads at the ends, a rotatable shaft mounted transversely of the cylinder, the piston being longitudinally slotted to receive the shaft, means for connecting the shaft to the tie rod of vehicle steering mechanism for turning the shaft axially as the tie rod is moved endwise, a pulley fixed to the shaft having a peripheral cam surface, a member wound on said surface and terminally connected to the heads of the piston for moving the piston endwise when the shaft is rotated, the cam surface accelerating the piston movement at the center of stroke.

3. In dirigible headlight mechanism, motion transmitting means comprising a cylinder having heads at the ends, a piston in the cylinder having heads at the ends of less diameter than the cylinder, rubber containers filled with fluid medium confined between the heads of the cylinder and the heads of the piston, the containers having rolling and unrolling action on the piston heads, a rotatable shaft mounted transversely of the cylinder, the piston being longitudinally slotted to receive the shaft, means for connecting the shaft to the tie rod of vehicle steering mechanism for turning the shaft axially when the tie rod is moved endwise, a pulley fixed to the shaft within the piston, a cable wound upon the pulley and secured at the ends to respective heads of the piston for moving the piston endwise when the shaft is turned, and fluid conducting pipes entering the heads of the cylinder and communicating with the rubber containers for operating hydraulic headlight mechanism when the containers are alternately deformed by movement of the piston.

WALLACE S. THOMPSON.
WALTER V. MOORE.